United States Patent [19]

Mori et al.

[11] Patent Number: 4,978,587
[45] Date of Patent: Dec. 18, 1990

[54] MULTILAYER SLIDING MATERIAL

[75] Inventors: Sanae Mori; Masaaki Sakamoto, both of Nagoya; Motomu Wada, Owariasahi; Hideo Ishikawa, Komaki, all of Japan

[73] Assignee: Daido Metal Company Ltd., Nagoya, Japan

[21] Appl. No.: 365,404

[22] Filed: Jun. 13, 1989

[51] Int. Cl.$^5$ .............................................. B32B 15/01
[52] U.S. Cl. .................................... 428/645; 428/646
[58] Field of Search .............................. 428/645, 646

[56] References Cited

U.S. PATENT DOCUMENTS

| | | | |
|---|---|---|---|
| 2,605,149 | 7/1952 | Schaefer et al. | 428/645 |
| 2,621,988 | 12/1952 | Donley | 428/645 |
| 2,635,020 | 4/1953 | Beebe, Jr. | 428/645 |
| 2,765,520 | 10/1956 | Donley | 428/645 |
| 3,307,926 | 3/1967 | Thomas et al. | 428/646 |
| 3,403,010 | 9/1968 | MacDonald et al. | 428/645 |
| 3,623,205 | 11/1971 | Scott | 428/643 |
| 3,658,488 | 4/1972 | Brown et al. | 428/613 |
| 3,732,083 | 5/1973 | Le Brasse et al. | 428/650 |
| 4,121,928 | 10/1978 | Mori | 419/3 |
| 4,189,525 | 2/1980 | Mori | 428/646 |
| 4,206,268 | 6/1980 | Roemer et al. | 428/645 |
| 4,470,184 | 9/1984 | Fukuoa et al. | 427/383.7 |
| 4,562,122 | 12/1985 | Hodes et al. | 428/646 |
| 4,696,867 | 9/1987 | Eastwood | 428/650 |
| 4,707,194 | 11/1987 | Eastwood | 148/11.5 A |

FOREIGN PATENT DOCUMENTS

| | | | |
|---|---|---|---|
| 0601801 | 7/1960 | Canada | 428/646 |
| 52-20336 | 2/1977 | Japan . | |
| 52-21447 | 6/1977 | Japan . | |
| 55-2441 | 1/1980 | Japan . | |
| 60-36641 | 2/1985 | Japan . | |
| 60-41695 | 9/1985 | Japan . | |
| 61-272358 | 12/1986 | Japan . | |
| 60-1173 | 4/1948 | United Kingdom . | |
| 62-4401 | 6/1949 | United Kingdom . | |

Primary Examiner—Theodore Morris
Assistant Examiner—David W. Schumaker
Attorney, Agent, or Firm—Browdy and Neimark

[57] ABSTRACT

A multilayer sliding material which is used, in particular, as the material of the bearings in internal combustion engines, comprising a steel backing layer, a bearing layer of copper-based alloy bonded to the steel backing layer, a silver or silver alloy plating layer bonded to the bearing layer, and a surface layer of lead-based alloy bonded to the silver or silver alloy plating layer, the silver or silver alloy plating layer having a thickness of more than 3 microns but not more than 50 microns. The multilayer sliding material having a thick plating layer of silver or silver alloy, excels in seizure-resisting.

9 Claims, 1 Drawing Sheet

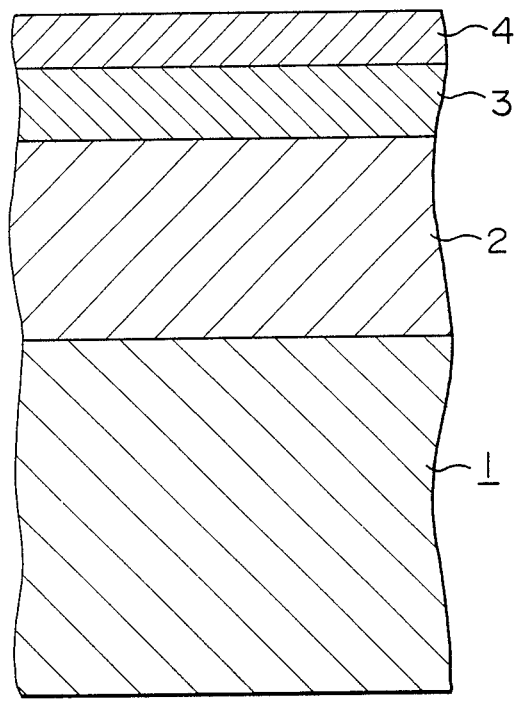

4,978,587

MULTILAYER SLIDING MATERIAL

BACKGROUND OF THE INVENTION

This invention relates to a multilayer sliding material which is used as the material of the bearings in automobiles, ships, agricultural machines and, in particular, internal combustion engines and, more specifically, to a multilayer sliding material which excels in seizure-resisting, and, still more specifically, to a multilayer sliding material which is equipped with a thick plating layer of silver or silver alloy.

Conventionally, the material of a high-load slide bearing for internal combustion engines generally comprises a bearing layer of a copper-based alloy bonded to a steel backing layer, the inner surface of the bearing layer being electroplated with a surface layer of a lead-based-type alloy, directly or through the intermediate dam layer. The dam layer serves to prevent the tin or indium in the surface layer from diffusing through thermal diffusion into the copper-alloy layer constituting the bearing layer as the engine oil temperature rises, which diffusion often occurs if the bearing layer of a copper-based alloy is directly electroplated with a surface layer of a lead-based alloy. Since any diffusion of the tin or indium in the surface layer into the copper alloy layer extremely deteriorates the anti-corrosion and abrasion resistance properties of this lead alloy surface layer, the intermediate dam layer which serves as a diffusionpreventing layer is provided through electroplating of nickel, silver, cobalt, iron, etc., usually with a thin plating thickness of 0.5 to 3 $\mu$. Regarding silver, in particular, a bearing material for aeroplanes has long been used which comprises a steel backing layer whose surface is plated with silver with an ultra-thin plating thickness of 0.1 to 0.3 mm, and a surface layer of lead or a lead alloy provided on the silver layer. In this case, however, it is necessary for the electro-plating to be effected in three or four stages, with a thickness of 0.1 to 0.3 mm so that the adhesion between the silver and the steel may be secured.

Recently, gasoline and diesel engines used in smaller automobiles, in particular passenger cars, have been used at a high-speed rotation range. Accordingly, further improvement in seizure-resisting, abrasion-resistance and fatigue-resistance properties has come to be required with respect to engine bearings. Conventionally available three-layers copper-type alloy materials provided with a lead-alloy surface layer had such drawback that premature flow abrasion of the lead-alloy surface layer was apt to occur in particular during high-speed operation, due to the oil temperature rise. In the case of those materials which employ nickel for the intermediate dam layer, the exposure of the nickel layer to the surface often gives rise to galling when the shaft comes directly into metallic contact with the nickel layer. Of course, absence of the intermediate dam layer will lead to the above-mentioned problem of surface layer corrosion or abrasion due to the diffusion of tin or indium.

As a component of the intermediate dam layer, silver is desirable in that it is softer than nickel, cobalt, or iron, and that it excels in seizure-resisting because it does not combine chemically with iron which is a main component of a shaft, so that galling occuring at the time of surface layer abrasion can be remarkably improved. Regrettably, in the case of a thickness range of 0.5 to 3 $\mu$, the dam effect of the Ag layer for preventing diffusion is poorer than that of nickel, etc. Moreover, it provides no substantial improvement in the seizure-resisting property during high-speed operation.

SUMMARY OF THE INVENTION

It is accordingly an object of this invention to provide a multilayer sliding material in which the above-mentioned problems experienced with the prior art have been eliminated.

In accordance with this invention, there is provided a multilayer sliding material comprising a steel backing layer, a bearing layer of copper-based alloy bonded to the steel backing layer, a silver or silver alloy plating layer bonded to the bearing layer, and a surface layer of lead-based alloy bonded to the silver alloy plating layer, the silver or silver alloy plating layer having a thickness of more than 3 microns but not more than 50 microns.

BRIEF DESCRIPTION OF THE DRAWING

The drawing is a sectional view of a multilayer sliding material in accordance with this invention.

DETAILED DESCRIPTION OF THE INVENTION

The flow abrasion which occurs during high-speed rotation of the shaft is attributable to the fact that the temperature around present-day bearings is higher than in the past. In the case of a metal having a low melting point, such as a lead alloy, in particular, a temperature rise of even 10° C. will lead to serious deterioration in mechanical properties.

While the oil temperature in former engines rose to around 130° C., in recent engines it sometimes reaches 150° to 170° C., and it is becoming more and more urgent to take steps to cope with this problem. What is most important in this regard is to allow the frictional heat generated on the surface of the bearing to dissipate itself from the surface layer to the outside as soon as possible. The rate of dissipation depends on the thermal conductivity of the bearing material. The thermal conductivity of the metals concerned is as follows: a lead alloy containing 10 wt. % tin has a value of 0.085; a copper alloy containing 23 wt. % lead and 3.5 wt. % tin has a value of 0.18; an iron alloy containing 0.1 wt. % C has a value of 0.16; nickel has a value of 0.22; and silver has a value of 1.0 (cal/cm² sec °C.). Silver has the highest heat conductivity of all practical metals. Thus, it has been ascertained both theoretically and through experiment that any flow of the surface layer can be prevented by providing through plating a silver layer which is thick to some degree directly underneath the surface layer so as to allow the frictional heat to be transferred to the under layer alloy more rapidly. However, a silver layer thickness of 3 $\mu$ or less will result in poor dispersion of frictional heat and is apt to cause damage due to the earlier abrasion of the silver layer.

On the other hand, a silver layer thickness of more than 50 $\mu$ incurs a cost increase in material as well as in electroplating, so that it is hardly practical from the economic point of view. Thus, the thickness of the silver layer is determined by taking both performance and cost into account. A preferable thickness may be in the range of 4 to 20 $\mu$. In view of this, the present invention is characterized in that a silver plating layer is provided on the copper-type bearing alloy, and the underlayer copper alloy will serve as a bearing alloy even if the silver plating layer has been worn out. This feature of the invention is essentially distinguished over the three-layers bearing material which comprises a steel backing layer, a silver plating layer and a lead surface layer and which has been conventionally used in aeroplane engines and the like. The material of this invention is superior to the conventional three-layers bearing material in both performance and economy. While the thickness of this copper-alloy bearing layer is preferably in the range of 0.15 mm to 0.5 mm, it may be thicker in the case of larger engines. From the viewpoint of the bearing structure, the hardness of the copper-alloy underlayer is preferably selected to be higher than the Vickers hardness of silver which is in the range of 50 to 70. In this connection, a lead-bronze alloy, such as one containing 3.5 wt. % tin, 23 wt. % lead and the balance copper, or one containing 3.5 wt. % tin, 17 wt. % lead, and the balance copper is suitable since it has a Vickers hardness of 70 to 100. In addition to the fact that the silver-plating layer acts as a bearing metal having a satisfactory thermal conductivity, the silver plating layer plays the role of the above-mentioned dam layer. Also, from the view point of the dam effect, it is desirable that this plating layer is thick, that is, a thickness of more than 3 $\mu$ will provide a greater diffusion prevention effect than a lesser thickness. Instead of the pure silver layer, a silver-alloy plating layer, such as silver-lead alloy, silver-indium alloy, or silver-thallium alloy, may be employed as a material imparting a similar effect. Next, the components of the surface layer may be almost any of those used in a usual three-layers bearing. Namely, compositions such as lead-indium, lead-indium-copper, lead-tin-copper, lead-tin-indium, lead-tin-indium-copper, may be used. In this regard, the inventors of the present invention have found that, in the case of a composition including tin, the content of Sn must be 8% or less, preferably less than 5% in order that a satisfactory performance can be obtained. If the tin content is more than 8%, the tin will be dispersed into the silver layer under high temperatures, deteriorating the adhesive force with the lapse of time. The thickness of the surface layer is preferably in the range of 3 to 50 $\mu$; if it is less than 3 $\mu$, the desired effect of the surface layer cannot 15 be expected. But, if it is more than 50 $\mu$, the fatigue resistance and load resistance properties thereof will be deteriorated. The so-called multilayer bearing material included in the scope of the multilayer sliding material of this invention may also be provided on its surface with a tin-type or lead-type flash plating layer having a thickness of 2 $\mu$ or less. This is effective, in particular, when rust prevention is required.

(EXAMPLES)

In order to evaluate the performance of the material of this invention, examples thereof were prepared as follows: first, lead bronze powder for the bearing layer 2 was bonded to a steel backing 1 by the sintering-rolling method, thereby preparing a bimetal. The lead bronze alloy employed contained 23 wt. % lead, 3.5 wt. % tin and the balance copper. It is of course possible to employ other types of alloy, such as a copper-lead type alloy, a copper-tin type alloy or a copper-lead-tin type alloy.

Subsequently, this bimetal was press-worked into a half bearing configuration having a size suitable for a bearing performance test, and was finished into a predetermined size through machining. The thickness of the intermediate layer 2 of a lead bronze alloy thus finished was 0.25 mm. The inner surface of the finished product was subjected to the processes of solvent degreasing, alkaline electrolytic degreasing and acid cleaning, and was provided with a silver plating layer 3. The silver plating was performed using a cyanide bath, at a current density of 0.5 to 2 ampere/square-decimeter, and with the various thicknesses given in Table 2. Various lead based alloys 4 were plated on this silver plating layer by means of a boron-fluorine bath. The flash plating layer for rust prevention was provided with a thickness of 1 to 2 $\mu$ by means of a boron-fluorine bath, using pure tin, pure lead or a lead alloy containing 10 wt. % tin.

Table 1 shows the results of a test conducted in order to ascertain the seizure-resisting property of silver, using half-bearings with no lead-type surface layer. The seizure test was conducted using SAW No. 20 lubricating oil previously heated to 100° C., at a rotational speed of 2000 rpm. After an accustomed driving with no load of 1 hour, the oil supply rate was reduced to 20 cc/min, and a load of 100 KgF/cm$^2$ was applied to the half-bearings. After the application of the first load, a cumulative load of 50 KgF/cm$^2$ was added thereto every 10 minutes, until the bearing rear surface temperature exceeded 200° C. or the current value exceeded 15 ampere, at the time of which phenomenon it was judged that seizure had occurred. It will be appreciated from Table 1 that silver is remarkably superior in seizure resistance to nickel.

Table 2 show the results of another similar test conducted on half-bearings equipped with a lead surface layer. The underlayer bearing alloy, shaft material and shaft diameter were the same as in the first test. It will be appreciated from Table 2 that a thick silver plating layer provides an excellent seizure resistance. The test showed that the comparison examples, i.e., the one using nickel, the one having a thin silver plating layer and the one including a thin lead-alloy surface layer were all inferior in seizure resistance in comparison with the material of this invention.

Table 3 shows the change with the lapse of time in the adhesive strength of the surface layer at a temperature of 165° C. The adhesive strength was measured by casting a solder alloy over the surface to conduct a tensible test. It will be clearly appreciated from Table 3 that a material whose surface layer contains much tin causes deterioration with the lapse of time in the adhesive force. As stated above, the product of this invention is a bearing material which excels, in particular, in seizure resistance. It is suitable to be used, in particular, as the material of the bearings in a small diesel engine operating under high-speed and heavy-load conditions, or an engine equipped with a turbo-charger.

The results of a rust prevention test conducted on examples equipped with a tin-flash plating with thicknesses of 2 $\mu$, 1 $\mu$ and 0.5 $\mu$ as well as an example with no flash plating showed that the examples having a tin-flash plating with a thickness of 1 or 2 $\mu$ cause no rust on the bearing back surface over a period of more than one year, whereas that having a tin-flash plating with a thickness of 0.5 $\mu$ caused a slight rust after about 7 months. Those examples equipped with no flash-plating layer caused rust on the bearing rear surface within a half to one month unless rust prevention oil was used. Thus, if the period before the assembling of the bearing into an engine (guarantee period) is relatively long, provision of a tin-flash plating layer is effective for rust prevention. Those bearings equipped with no flash plating layer can be protected against rust generation by applying thereto some rust prevention oil.

TABLE 1

| | Maximum bearing pressure when no seizure is involved. (Kgf/cm$^2$) |
|---|---|
| | 200  400  600  800 |
| Ag | [bar extending to ~800+ with dispersion*] |
| Ni | [bar extending to ~300 with dispersion] |

* ▨ indicates dispersion.
Substrate bearing alloy: Cu - 23% Pb - 3.5% Sn
Shaft material: S55C
Shaft diameter: 53 mm

TABLE 2

| Plating layer | | Surface layer | | Maximum bearing pressure when no seizure is involved. (Kgf/cm$^2$) |
|---|---|---|---|---|
| Material | Thickness μm | Material | Thickness μm | 1000  1200  1400  1600 |

Products of this invention

| Material | Thickness μm | Material | Thickness μm | |
|---|---|---|---|---|
| Ag | 4 | Pb-11 wt % In | 15 | [bar to ~1550] |
| Ag-5Pb | 4 | " | 15 | [bar to ~1450] |
| " | 4 | Pb-5In-2Cu | 15 | [bar to ~1500] |
| " | 10 | Pb-11In | 10 | [bar to ~1450] |
| " | 10 | Pb-5In-2Cu | 10 | [bar to ~1500] |
| " | 10 | Pb-4Sn-7In | 10 | [bar to ~1500] |
| " | 20 | Pb-11In | 5 | [bar to ~1550] |
| " | 40 | " | 5 | [bar to ~1500] |

Comparison products

| Material | Thickness μm | Material | Thickness μm | |
|---|---|---|---|---|
| Ni | 4 | " | 15 | [bar to ~1300] |
| " | 20 | " | 5 | [bar to ~1200] |
| Ag | 1.0 | Pb-11In | 15 | [bar to ~1400] |
| " | 10 | " | 2 | [bar to ~1150] |

TABLE 3

| | | Adhesive strength at a time elapsing after 165° C. is reached (Kgf/mm$^2$) | | | |
|---|---|---|---|---|---|
| Plating layer | Surface layer | No lapse time | 150 Hr | 500 Hr | 1000 Hr |

Products of this invention

| Ag 4 microns | Pb-11 wt % In | 6.5 | 6.2 | 6.4 | 6.6 |
| Ag 4 microns | Pb-5 In-2 Cu | 7.5 | 7.2 | 7.5 | 7.4 |
| Ag 4 microns | Pb-4 Sn-7 In | 7.0 | 7.0 | 7.1 | 6.9 |

Comparison products

| Ag 4 microns | Pb-10 Sn-10 In | 6.8 | 6.7 | 4.2 | 1.8 |
| Ag 4 microns | Pb-10 Sn-2.5 Cu | 7.3 | 2.0 | 1.5 | 1.0 |
| Ni 1.5 microns | Pb-11 In | 7.9 | 7.4 | 7.6 | 7.8 |

We claim:

1. A multilayer sliding material comprising a steel backing layer, a bearing layer of copper-based alloy bonded to the steel backing layer which bearing layer has a thickness of 0.15 to 0.5 mm, a silver or silver alloy plating layer bonded to the bearing layer which plating layer has a thickness of more than 3 μm but not more than 50 μm, and a surface layer of lead-based alloy bonded to the silver or silver alloy plating layer.

2. A multilayer sliding material as claimed in claim 1, wherein said surface layer is made of an alloy selected from a group which consists of a lead-indium alloy, a lead-indium-copper alloy, an alloy containing lead and not more than 8 wt. % Sn; an alloy containing lead, not more than 8 wt. % Sn and copper; an alloy containing lead, not more than 8 wt. % Sn and indium; and an alloy containing lead, not more than 8 wt. % Sn, indium and copper, said surface layer having a thickness in the range of 3 to 50 microns.

3. A multilayer sliding material as claimed in claim 2, wherein said multilayer sliding material includes on its inner and outer surfaces flashplating layers of a tin-based alloy or a lead-based alloy having a thickness of 2 microns or less.

4. A multilayer sliding material as claimed in claim 1, wherein the bearing layer of copper-based alloy is made of one selected from the group consisting of lead bronze alloy, copper-lead alloy, copper-tin alloy, and copper-lead-tin alloy.

5. A multilayer sliding material as claimed in claim 4, wherein the bearing layer of copper-based alloy is made of an alloy consisting of 23 wt. % lead, 3.5 wt. % tin and the balance copper and incidental impurities.

6. A multilayer sliding material used for a larger engine, comprising a steel backing layer, a bearing layer of copper-based alloy bonded to the steel backing layer which bearing layer has a thickness of more than 0.5 mm, a silver or silver alloy plating layer bonded to the bearing layer which plating layer has a thickness of more than 3 $\mu$m, and a surface layer of lead-based alloy bonded to the silver or silver alloy plating layer.

7. A multilayer sliding material as claimed in claim 5, wherein said multilayer sliding material includes on its inner and outer surfaces flash-plating layers of a tin-based alloy or a lead-based alloy having a thickness of 2 microns or less.

8. A multilayer sliding material as claimed in claim 6, wherein the bearing layer of copper-based alloy is made of one selected from the group consisting of lead bronze alloy, copper-lead alloy, copper-tin alloy, and copper-lead-tin alloy.

9. A multilayer sliding material as claimed in claim 8, wherein the bearing layer of copper-based alloy is made of an alloy consisting of 23 wt. % lead, 3.5 wt. % tin, and the balance copper and incidental impurities.

* * * * *